US007068595B2

(12) United States Patent
Perlman et al.

(10) Patent No.: US 7,068,595 B2
(45) Date of Patent: Jun. 27, 2006

(54) METHOD AND APPARATUS FOR FACILITATING INSTANT FAILOVER DURING PACKET ROUTING

(75) Inventors: Radia J. Perlman, Carlisle, MA (US); John V. W. Reynders, Newton, MA (US)

(73) Assignee: SUN Microsystems, Inc., Santa Clara, CA (US)

( * ) Notice: Subject to any disclaimer, the term of this patent is extended or adjusted under 35 U.S.C. 154(b) by 936 days.

(21) Appl. No.: 09/834,771

(22) Filed: Apr. 13, 2001

(65) Prior Publication Data

US 2002/0150043 A1 Oct. 17, 2002

(51) Int. Cl.
*H04L 12/26* (2006.01)

(52) U.S. Cl. ............... 370/218; 370/216; 370/217; 370/389; 370/392; 370/394

(58) Field of Classification Search ........ 370/216–218, 370/392, 394, 389
See application file for complete search history.

(56) References Cited

U.S. PATENT DOCUMENTS

| 5,455,865 | A | | 10/1995 | Perlman ................. 380/49 |
| 6,122,753 | A | * | 9/2000 | Masuo et al. ............. 714/4 |
| 6,421,316 | B1 | * | 7/2002 | Masuo ..................... 370/216 |
| 6,530,032 | B1 | * | 3/2003 | Shew et al. ................ 714/4 |
| 6,741,552 | B1 | * | 5/2004 | McCrosky et al. ....... 370/218 |
| 2001/0033548 | A1 | * | 10/2001 | Saleh et al. .............. 370/218 |

FOREIGN PATENT DOCUMENTS

| EP | 0 461 279 A1 | 12/1991 |
| EP | 0 912 028 A2 | 4/1999 |

* cited by examiner

*Primary Examiner*—Wellington Chin
*Assistant Examiner*—Mark A. Mais
(74) *Attorney, Agent, or Firm*—Park, Vaughan & Fleming, LLP

(57) ABSTRACT

One embodiment of the present invention provides a system that facilitates instant failover during packet routing by employing a flooding protocol to send packets between a source and a destination. Upon receiving a packet containing data at an intermediate node located between the source and the destination, the system determines whether the packet has been seen before at the intermediate node. If not, the system forwards the packet to neighboring nodes of the intermediate node. In one embodiment of the present invention, forwarding the packet to neighboring needs involves forwarding the packet to all neighboring nodes except the node from which the packet was received. In one embodiment of the present invention, determining whether the packet has been seen before involves examining a sequence number, $S_R$, contained within the packet to determine whether the sequence number has been seen before.

21 Claims, 2 Drawing Sheets

METHOD AND APPARATUS FOR FACILITATING INSTANT FAILOVER DURING PACKET ROUTING

BACKGROUND

1. Field of the Invention

The present invention relates to transferring data packets across a network. More specifically, the present invention relates to a method and an apparatus for facilitating instant failover during packet routing by employing a flooding protocol to send packets on all possible paths between a source and a destination.

2. Related Art

Fault tolerant networks commonly provide redundant communication links between machines that are communicating with each other. If one link fails, the system will ideally failover instantly to another link.

However, traditional routing techniques take a significant amount of time to detect and route around a failure. Consequently, these traditional routing techniques will not work for systems that require instant failover.

Instead of these traditional techniques, a flooding protocol can be used that sends all packets everywhere. This is typically accomplished by configuring intermediate nodes between a source and a destination so that they forward a packet to all neighboring nodes except the node from which the packet was received. A flooding protocol has the property that if there is any path between the source and the destination, the packet will be delivered. It does not depend on intermediate routers having consistent forwarding tables or knowing the topology of the network.

In theory, a flooding protocol can create an exponential number of packets, which can seriously degrade network performance. However, a "link-state routing protocol" uses flooding with reasonable efficiency for distributing routing information throughout a network. The reason the link-state routing protocol can be efficient is that each router stores a link state packet (LSP) with the highest sequence number from each source. When a router receives an LSP from a source, it checks its database and only stores and floods the LSP if the sequence number is higher than the one in the database for the source. In this way, a router will not reflood the same packet or an older packet.

Unfortunately, the same technique will not work for data packets because routers do not store data packets and consequently cannot recognize duplicates. Moreover, data packets may arrive out-of-order, and unlike LSPs, where only the most recently generated LSP is of interest, a large number of data packets may be en route at any one time, and all of these data packets are of interest.

What is needed is a method and apparatus for facilitating flooding of data packets without seriously degrading network performance.

SUMMARY

One embodiment of the present invention provides a system that facilitates instant failover during packet routing by employing a flooding protocol to send packets between a source and a destination. Upon receiving a packet containing data at an intermediate node located between the source and the destination, the system determines whether the packet has been seen before at the intermediate node. If not, the system forwards the packet to neighboring nodes of the intermediate node.

In one embodiment of the present invention, forwarding the packet to neighboring needs involves forwarding the packet to all neighboring nodes except the node from which the packet was received.

In one embodiment of the present invention, determining whether the packet has been seen before involves examining a sequence number, $S_R$, contained within the packet to determine whether the sequence number has been seen before.

In a variation in this embodiment, the sequence number can include a sequence number inserted into a payload of the packet; a sequence number located within an Internet Protocol (IP) header of the packet; or a sequence number located within a layer 4 header of the packet.

In a variation in this embodiment, examining the sequence number involves looking up a highest received sequence number, $S_H$, stored at the intermediate node based upon the source of the packet (and possibly based on the destination of the packet as well).

In a variation in this embodiment, determining whether the packet has been seen before involves examining a record, R, indicating which of N possible sequence numbers preceding a highest received sequence number, $S_H$, have been seen before.

In a variation in this embodiment, in determining whether the packet has been seen before, the system looks up a highest received sequence number, $S_H$. If $S_R > S_H$, the system overwrites $S_H$ with $S_R$ and updates a record, R, to indicate which of N possible sequence numbers preceding $S_H$ have been seen before. The system also forwards the packet to neighboring nodes. If $S_H - N > S_R$, the system discards the packet. Finally, in the case where $S_H \geq S_R \geq S_H - N$, the system discards the packet if R indicates that $S_R$ has been seen before. Otherwise, if R indicates the packet has not been seen before, the system updates R to indicate that $S_R$ has been seen, and forwards the packet to the neighboring nodes. Note that in one embodiment of the present invention, the record, R, is a bit vector of size N.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system.

This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Network

Figure 1:
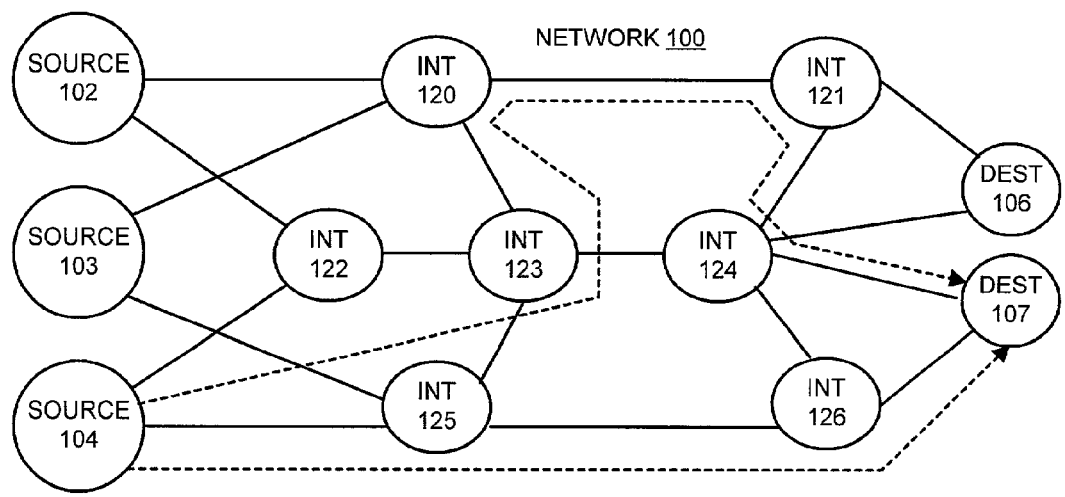
FIG. 1 illustrates a network in accordance with an embodiment of the present invention.

FIG. 1 illustrates a network 100 in accordance with an embodiment of the present invention. Network 100 includes a number of source nodes 102–104, which send packets to a number of destination nodes 106–107. These packets pass through a number of intermediate nodes 120–126, which ultimately route the packets to their specified destinations. Note that source nodes 102–104 and destination nodes 106–107 can include any type of computing device, including, but not limited to, a computer system based on a microprocessor, a mainframe computer, a digital signal processor, a portable computing device, a personal organizer, a device controller, and a computational engine within an appliance. Intermediate nodes 120–126 can also include any type of router or computing device that can be used to forward packets between source nodes 102–104 and destination nodes 106–107.

Note that the nodes in network 100 can be located at geographically distributed locations on the Internet, or alternatively, within a local intranet inside of an organization. Furthermore, the flooding protocols disclosed in this specification can additionally be applied to routing data packets inside of a computer system.

Also note that network 100 contains redundant links that provide multiple pathways between each source node 102–104 and each destination node 106–107. This provides a level of fault tolerance if one or more links or nodes fail. For example, consider the case where source node 104 is sending packets to destination node 107 along path A, which passes through intermediate nodes 125 and 126. If one of the nodes or links along path A fails, the system can perform a rerouting operation to send packets along path B, which passes through intermediate nodes 122, 123, 120, 121 and 124. Unfortunately, this rerouting process can require a great amount of time, which makes it impossible to perform an instant failover.

In order to make an instant failover possible, the present invention uses a flooding protocol to distribute packets between source nodes 102–104 and destination nodes 106–107. In this way, if a link or a node fails, the packets that are in transit at the time of the failure will be received along an alternate pathway. This flooding protocol is described in more detail with reference to FIGS. 2–3 below.

Comparing Sequence Numbers

The present invention uses sequence numbers within packets to prevent a potential exponential explosion in packets during the flooding protocol. These sequence numbers can be created through a number of different mechanisms. In one embodiment of the present invention, each source node explicitly creates and inserts a sequence number into each packet. In another embodiment, a sequence number from an Internet Protocol (IP) header of the packet is used. In yet another embodiment, a sequence number located within a layer 4 header of the packet, such as a transmission control protocol (TCP) sequence number, is used.

Figure 2:
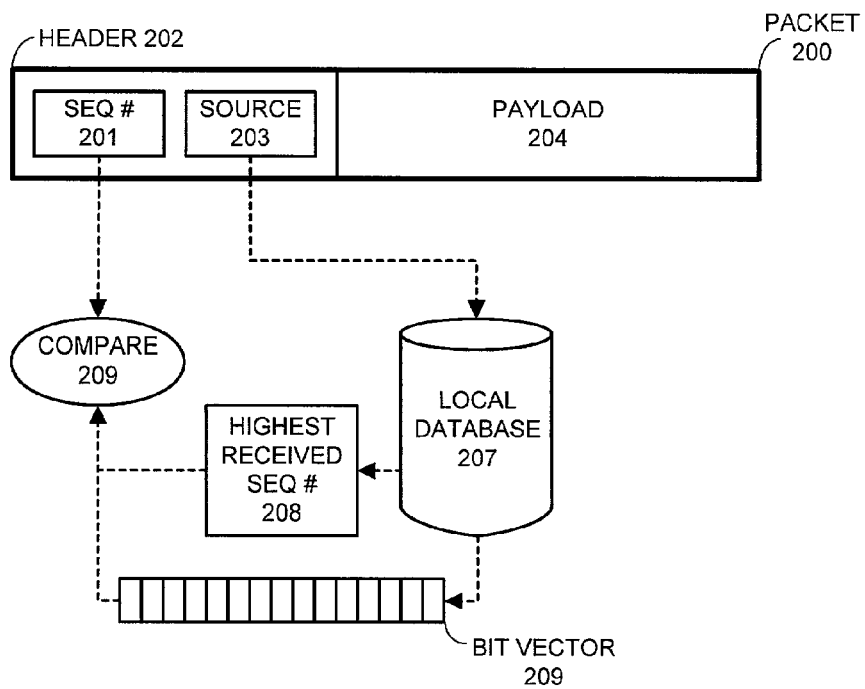
FIG. 2 illustrates how a sequence number is compared at a router in accordance with an embodiment of the present invention.

Referring to FIG. 2, each intermediate node 120–126 records a highest received sequence number $S_H$ 208 and a bit vector R 209 of size N for each source node within a local database 207. Bit vector R 209 is used to indicate which of the N possible sequence numbers preceding the highest received sequence number $S_H$ 208 have been seen before.

Note that some IP implementations maintain sequence numbers for each source-destination pair. In this case, the present invention correspondingly keeps track of the highest sequence number received $S_R$ 208 and keeps track of bit vector R 209 for each source-destination pair.

When a packet 200 is received at an intermediate node, the source address (and possibly the destination address) is used to lookup the highest received sequence number $S_R$ 208 and bit vector R 209 in database 207. This highest received sequence $S_R$ 208 number and bit vector R 209 are compared with the sequence number $S_R$ 201 retrieved from packet 200 as is described in more detail below with reference to FIG. 3 below.

Within this specification and within the attached claims, a first sequence number is often described as being "greater than" a second sequence number. The term "greater than" for purposes of this specification and the attached claims means that the first sequence number occurs later in the sequence than the second sequence number. However, because sequence numbers can wrap around to zero when they reach a maximum value, the actual numerical value of the first sequence number may be less than the actual numerical value of the second sequence number. Similarly, if a first sequence number is described as being "less than" a second sequence number, this means that the first sequence number occurs earlier in the sequence than the second sequence number.

Traditionally, the method of comparing sequence numbers in a sequence number space of size N is as follows. Given two sequence numbers A and B, A is considered to be less than B if the absolute value of A−B is less than or equal to N/2, and A is less than B, or if the absolute value of A−B is greater than N/2, and A is greater than B. It is preferable if this sequence number space is large enough that it is highly unlikely for an old packet to be mistaken for a new packet.

One case that needs to be handled arises when a source restarts having forgotten is previously used sequence number, or when the network has partitioned, and an intermediate node has not seen the most recent packets from the source, so that the source's current sequence number would look old. In this case, an intermediate node, who has seen no packet from a particular source for some amount of time, could note that its current knowledge of the sequence number is out-of-date and the next packet seen from that source should be accepted regardless of sequence number. Note that "being accepted" in this context means that the packet's sequence number is taken to be highest sequence number seen so far.

Process of Forwarding a Data Packet

Figure 3:
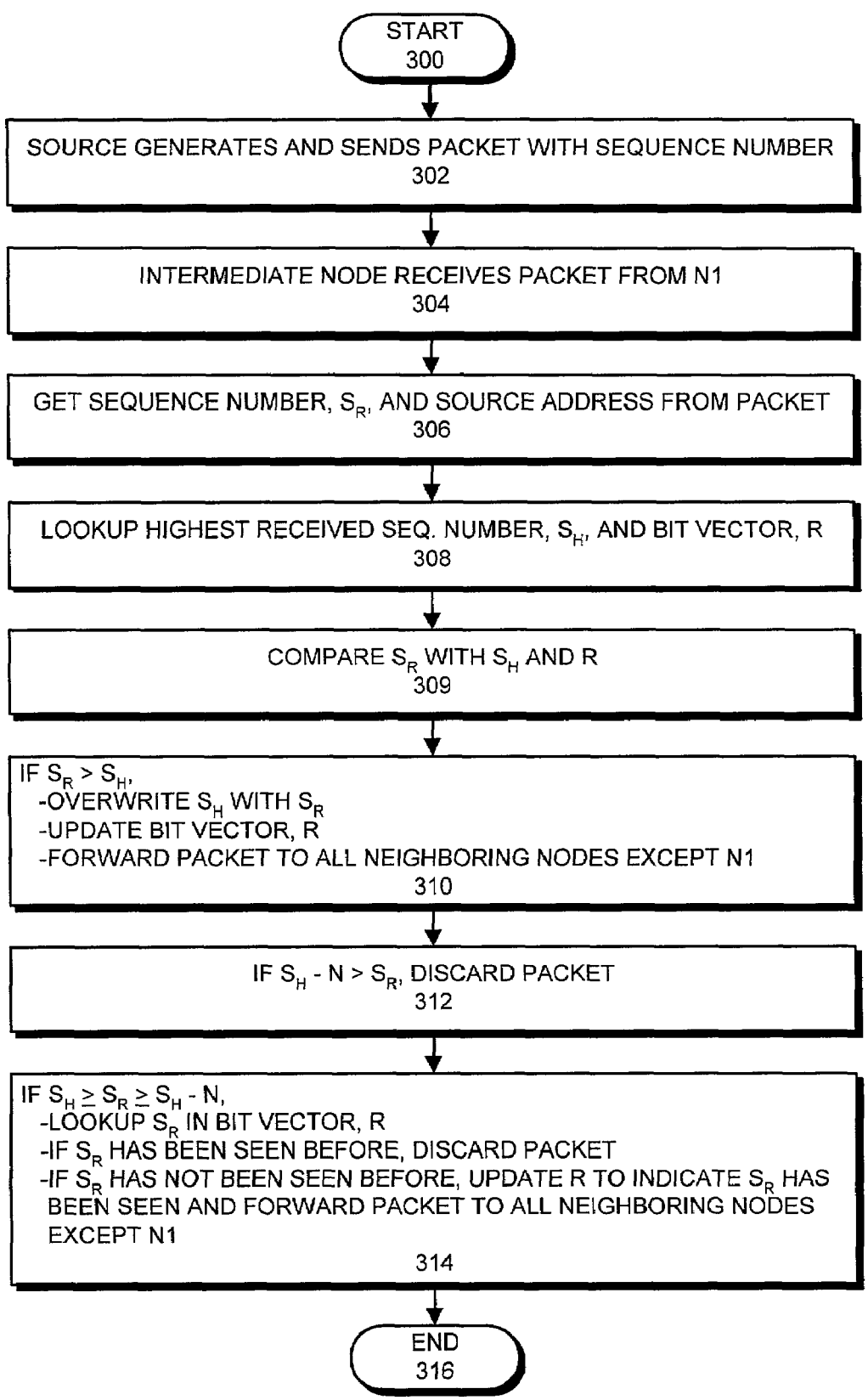
FIG. 3 is a flow chart illustrating the process of forwarding a data packet in accordance with an embodiment of the present invention.

FIG. 3 is a flow chart illustrating the process of forwarding a data packet in accordance with an embodiment of the present invention. The general idea is to recognize when a packet has already been flooded. This is accomplished by storing the highest received sequence number, $S_H$, for each source. If a packet is received from a source with a higher sequence number, $S_R$, the highest received sequence number $S_R$ is replaced with $S_H$. Additionally, the associated bit vector R 209 is shifted to throw away information about any sequence numbers that are more than N smaller than the new highest received sequence number, $S_H$. The packet is also flooded to all neighboring nodes, expect the node from which it was received.

More specifically, the process starts when a source node 104 generates and sends a packet 200 with a sequence number 201 to a destination (step 302). As mentioned before, this sequence number can be assigned across all packets that originate from source node 104, or can be assigned separately for each individual destination.

Next, an intermediate node 123 receives packet 200 from a neighboring node 125 (step 304). Intermediate node 123 then retrieves sequence number $S_R$ 201 and source address 203 from packet 200 (step 306). Intermediate node 123 uses source address 203 to lookup a highest received sequence number $S_H$ 208 and bit vector R 209 for source node 104 in local database 207 (step 308). Next, intermediate node 123 compares sequence number $S_R$ 201 with highest received sequence number $S_H$ 208 and bit vector R 209 (step 309).

If $S_R > S_H$, the received sequence number, $S_R$, is higher than the highest received sequence number, $S_H$. In this case, the system forwards packet 200 to all neighboring nodes 120, 122 and 124, except the neighboring node 125 from which the packet was received. The system also overwrites $S_H$ with $S_R$ and updates bit vector R 209 by shifting it by a number of bits equal to the difference between the sequence number $S_R - S_H$, so that the updated bit vector R 209 applies to the updated highest received sequence number, $S_H$ (step 310).

If $S_H - N > S_R$, the sequence number $S_R$ is lower than any sequence numbers that are associated with the bit vector R 209. In this case, the system discards packet 200 (step 312). Note that in this embodiment of the present invention, we assume that, unlike LSPs, which must be reliably delivered, it is acceptable to have "reasonable" service for data packets. We are willing to lose some data packets due to congestion or transmission errors, because the alternative is to store packets at each intermediate hop until they are acknowledged, which takes up too much memory.

If $S_H \geq S_R \geq S_H - N$, the system looks up $S_R$ in bit vector R. If $S_R$ has been seen before, the system discards packet 200. Otherwise, if $S_R$ has not been seen before, the system updates R to indicate that $S_R$ has been seen, and forwards packet 200 to all neighboring nodes 120, 122 and 125, except the node 125 from which packet 200 was received (step 314).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating instant failover during data packet routing by employing a flooding protocol to send data packets between a source and a destination, the method comprising:
   receiving a data packet at an intermediate node located between the source and the destination, wherein the data packet is enroute from the source to the destination;
   wherein the data packet is received from a first neighboring node;
   determining whether the data packet has been seen before at the intermediate node, wherein determining whether the data packet has been seen before involves examining a sequence number, $S_R$, contained within the data packet to determine whether the sequence number has been seen before, and
   wherein determining whether the data packet has been seen before involves examining a record, R, indicating the N possible sequence numbers preceding a highest received sequence number, $S_H$, that have been seen before; and
   if the data packet has not been seen before, forwarding the data packet to neighboring nodes of the intermediate node.

2. The method of claim 1, wherein forwarding the data packet to neighboring nodes involves forwarding the data packet to all neighboring nodes except the first neighboring node from which the data packet was received.

3. The method of claim 1, wherein the sequence number includes one of:
   a sequence number inserted into a payload of the data packet;
   a sequence number located within an Internet Protocol (IP) header of the data packet; and
   a sequence number located within a layer 4 header of the data packet.

4. The method of claim 1, wherein examining the sequence number involves looking up a highest received sequence number, $S_H$, stored at the intermediate node based upon the source of the data packet.

5. The method of claim 1, wherein examining the sequence number involves looking up a highest received sequence number, $S_H$, stored at the intermediate node based upon the source and the destination of the data packet.

6. The method of claim 1, wherein determining whether the data packet has been seen before involves:
   looking up a highest received sequence number, $S_H$;
   if $S_R > S_H$,
   overwriting $S_H$ with $S_R$,
   updating a record, R, indicating which of N possible sequence numbers preceding $S_H$ have been seen before, and
   forwarding the data packet to the neighboring nodes;
   if $S_H - N > S_R$, discarding the data packet; and
   if $S_H \geq S_R \geq S_H - N$, then
   if R indicates that $S_R$ has been seen before, discarding the data packet, and
   if R indicates the data packet has not been seen before, updating R to indicate that $S_R$ has been seen, and forwarding the data packet to the neighboring nodes.

7. The method of claim 6, wherein the record, R, is a bit vector of size N.

8. A computer-readable storage medium storing instructions that when executed by a computer cause the computer to perform a method for facilitating instant failover during data packet routing by employing a flooding protocol to send data packets between a source and a destination, the method comprising:
   receiving a data packet at an intermediate node located between the source and the destination, wherein the data packet is enroute from the source to the destination;
   wherein the data packet is received from a first neighboring node;
   determining whether the data packet has been seen before at the intermediate node, wherein determining whether the data packet has been seen before involves examining a sequence number. $S_R$, contained within the data packet to determine whether the sequence number has been seen before, and wherein determining whether the data packet has been seen before involves examining a record, R. indicating the N possible sequence numbers preceding a highest received sequence number. $S_H$, that have been seen before; and if the data packet has not been seen before, forwarding the data packet to neighboring nodes of the intermediate node.

9. The computer-readable storage medium of claim 8, wherein forwarding the data packet to neighboring nodes involves forwarding the data packet to all neighboring nodes except the first neighboring node from which the data packet was received.

10. The computer-readable storage medium of claim wherein the sequence number includes one of:
   a sequence number inserted into a payload of the data packet;
   a sequence number located within an Internet Protocol (IP) header of the data packet; and
   a sequence number located within a layer header of the data packet.

11. The computer-readable storage medium of claim wherein examining the sequence number involves looking up a highest received sequence number, $S_H$, stored at the intermediate node based upon the source of the data packet.

12. The computer-readable storage medium of claim wherein examining the sequence number involves looking up a highest received sequence number, $S_H$, stored at the intermediate node based upon the source and the destination of the data packet.

13. The computer-readable storage medium of claim wherein determining whether the data packet has been seen before involves:
   looking up a highest received sequence number, $S_H$;
   if $S_R > S_H$,
      overwriting $S_H$ with $S_R$,
      updating a record, R, indicating which of N possible sequence numbers preceding $S_H$ have been seen before, and
      forwarding the data packet to the neighboring nodes;
   if $S_H$-N>$S_R$, discarding the data packet; and
   if $S_H S_R S_H$-N,then
      if R indicates that $S_R$ has been seen before, discarding the data packet, and
      if R indicates the data packet has not been seen before, updating R to indicate that $S_R$ has been seen, and forwarding the data packet to the neighboring nodes.

14. The computer-readable storage medium of claim 13, wherein the record, R, is a bit vector of size N.

15. An apparatus that facilitates instant failover during data packet routing by employing a flooding protocol to send data packets between a source and a destination, the apparatus comprising:
   a receiving mechanism that is configured to receive a data packet at an intermediate node located between the source and the destination, wherein the data packet is enroute from the source to the destination;
   wherein the data packet is received from a first neighboring node;
   a determination mechanism that is configured to determine whether the data packet has been seen before at the intermediate node, wherein determining
   whether the data racket has been seen before involves examining a sequence number $S_R$, contained within the data packet to determine whether the sequence number has been seen before, and wherein determining whether the data packet has been seen before involves examining a record, R, indicating the N possible sequence numbers preceding a highest received sequence number, $S_H$, that have been seen before; and
   a forwarding mechanism that is configured to forward the data packet to neighboring nodes of the intermediate node if the data packet has not been seen before.

16. The apparatus of claim 15, wherein the forwarding mechanism is configured to forward the data packet to all neighboring nodes except the first neighboring node from which the data packet was received.

17. The apparatus of claim 15, wherein the sequence number includes one of:
   a sequence number inserted into a payload of the data packet;
   a sequence number located within an Internet Protocol (IP) header of the data packet; and
   a sequence number located within a layer header of the data packet.

18. The apparatus of claim 15, wherein the determination mechanism is configured to look up a highest received sequence number, $S_H$, stored at the intermediate node based upon the source of the data packet.

19. The apparatus of claim 15, wherein the determination mechanism is configured to look up a highest received sequence number, $S_H$, stored at the intermediate node based upon the source and the destination of the data packet.

20. The apparatus of claim 15, wherein the determination mechanism is configured to:
   look up a highest received sequence number, $S_H$;
   if $S_R > S_H$,to
      overwrite $S_H$ with $S_R$,
      update a record, R, indicating which of N possible sequence numbers preceding $S_H$ have been seen before, and to forward the data packet to the neighboring nodes;
   if $S_H$-N>$S_R$, to discard the data packet; and
   if $S_H \geq S_R \geq S_H$-N,to discard the data packet, if R indicates that $S_R$ has been seen before, and to update R to indicate that $S_R$ has been seen, and to forward the data packet to the neighboring nodes, if R indicates the data packet has not been seen before.

21. The apparatus of claim 20, wherein the record, R, is a bit vector of size N.

* * * * *

UNITED STATES PATENT AND TRADEMARK OFFICE
CERTIFICATE OF CORRECTION

PATENT NO. : 7,068,595 B2  Page 1 of 1
APPLICATION NO. : 09/834771
DATED : June 27, 2006
INVENTOR(S) : Radia J. Perlman et al.

It is certified that error appears in the above-identified patent and that said Letters Patent is hereby corrected as shown below:

In claim 10 (at column 7, line 14), please delete the phrase, "claim wherein" and replace with the phrase --claim 8, wherein--.

In claim 11 (at column 7, line 22), please delete the phrase, "claim wherein" and replace with the phrase --claim 8, wherein--.

In claim 12 (at column 7, line 26), please delete the phrase, "claim wherein" and replace with the phrase --claim 8, wherein--.

In claim 13 (at column 7, line 31), please delete the phrase, "claim wherein" and replace with the phrase --claim 8, wherein--.

In claim 13 (at column 7, line 42), please delete the equation, "$S_H S_R S_H$" and replace with the equation --$S_H \geq S_R \geq S_H$--.

In claim 15 (at column 8, line 6), please delete the word, "racket" and replace with the phrase --packet--.

In claim 17 (at column 8, line 28), please delete the phrase, "layer header" and replace with the phrase --layer 4 header--.

Signed and Sealed this

Third Day of October, 2006

JON W. DUDAS
*Director of the United States Patent and Trademark Office*